(12) United States Patent
Shreevastav et al.

(10) Patent No.: US 12,267,803 B2
(45) Date of Patent: Apr. 1, 2025

(54) MESSAGES RELATING TO LOCATION SERVICES

(71) Applicant: Telefonaktiebolaget LM Ericsson (publ), Stockholm (SE)

(72) Inventors: Ritesh Shreevastav, Upplands Väsby (SE); Åke Busin, Sollentuna (SE); Qian Chen, Mölndal (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 404 days.

(21) Appl. No.: 17/776,283

(22) PCT Filed: Oct. 13, 2020

(86) PCT No.: PCT/SE2020/050974
§ 371 (c)(1),
(2) Date: May 12, 2022

(87) PCT Pub. No.: WO2021/096405
PCT Pub. Date: May 20, 2021

(65) Prior Publication Data
US 2022/0394655 A1    Dec. 8, 2022

Related U.S. Application Data

(60) Provisional application No. 62/935,710, filed on Nov. 15, 2019.

(51) Int. Cl.
*H04W 64/00*    (2009.01)
*H04W 4/029*    (2018.01)
*H04W 4/12*    (2009.01)

(52) U.S. Cl.
CPC .......... *H04W 64/00* (2013.01); *H04W 4/029* (2018.02); *H04W 4/12* (2013.01)

(58) Field of Classification Search
None
See application file for complete search history.

(56) References Cited

U.S. PATENT DOCUMENTS

2019/0116486 A1*    4/2019    Kim ..................... H04W 8/10
2020/0053638 A1*    2/2020    Edge .................... H04W 88/14

FOREIGN PATENT DOCUMENTS

WO    2017119561 A1    7/2017

OTHER PUBLICATIONS

International Search Report and Written Opinion date Jan. 19, 2021 for International Application No. PCT/SE2020/050974 filed Oct. 13, 2020, consisting of 11-pages.
3GPP TS 36.305 V15.4.0; 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15); Jun. 2019, consisting of 91-pages.
(Continued)

*Primary Examiner* — Frantz Bataille
(74) *Attorney, Agent, or Firm* — Weisberg I.P. Law, P.A.

(57) ABSTRACT

An example method includes a method performed by a wireless device for sending a message relating to location services. The method includes establishing a user plane connection with a location management function, and sending a message relating to location services to the location management function using the user plane connection.

16 Claims, 14 Drawing Sheets

(56) References Cited

OTHER PUBLICATIONS

3GPP TS 38.305 V15.4.0; 3rd Generation Partnership Project; Technical Specification Group Radio Access Network; NG Radio Access Network (NG-RAN); Stage 2 functional specification of User Equipment (UE) positioning in NG-RAN (Release 15); Jun. 2019, consisting of 72-pages.
UserPlane Location Protocol Approved Version 2.0.5; OMA-TS-ULP-V2_0_5-20191028-A; Open Mobile Alliance, Oct. 28, 2019, consisting of 403-pages.
ETSI TS 124 571 V16.1.0; Technical Specification; 5G; 5G System (5GS); Control plane Location Services (LCS) procedures; Stage 3 (3GPPTS 24.571 version 16.1.0 Release 16), Aug. 2020, consisting of 32-pages.
ETSI TS 123 271 V14.2.0; Technical Specification; Digital cellular telecommunications system (Phase 2+) (GSM); Universal Mobile Telecommunications System (UMTS); LTE; Functional stage 2 description of Location Services (LCS) (3GPP TS 23.271 version 14.2.0 Release 14), Jul. 2017, consisting of 187-pages.
Indian Office Action dated Sep. 6, 2022 for Patent Application No. 202217027581, consisting of 5-pages.

\* cited by examiner

MESSAGES RELATING TO LOCATION SERVICES

CROSS-REFERENCE TO RELATED APPLICATIONS

This application is a Submission Under 35 U.S.C. § 371 for U.S. National Stage Patent Application of International Application No.: PCT/SE2020/050974, filed Oct. 13, 2020 entitled "MESSAGES RELATING TO LOCATION SERVICES," which claims priority to U.S. Provisional Application No. 62/935,710, filed Nov. 15, 2019, the entireties of both of which are incorporated herein by reference.

TECHNICAL FIELD

Examples of this disclosure relate to messages relating to location services, such as for example sending one or more of such messages or initiating setup of a user plane connection for such messages.

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Positioning has been a topic in LTE standardization since 3GPP Release 9. The primary objective is to fulfill regulatory requirements for emergency call positioning. Positioning in New Radio (NR) is proposed to be supported by the architecture shown in FIG. 1 and described below. The Location Management Function (LMF) is the location node in NR. There are also interactions between the location node and the gNodeB via the NRPPa protocol. The interactions between the gNodeB and the device are supported via the Radio Resource Control (RRC) protocol.

FIG. 1 shows an example of NG-RAN Release 15 (Rel-15) architecture 100. In FIG. 1, a User Equipment (UE) is connected to a gNB via a NR-Uu interface, and to an ng-eNB via a LTE-Uu interface. the gNB and ng-eNB form a NG-RAN. The gNB is connected to an Access and Mobility Management Function (AMF) via NG-C interface, while the ng-eNB is connected to the AMF via a NG-C interface. The gNB and ng-eNB are connected via the Xn interface. The AMF is connected to the LMF via the NLs interface. The LMF may also be connected to Evolved Serving Mobile Location Centre (E-SMLC).

In other examples, the gNB and ng-eNB may not always both be present. When both the gNB and ng-eNB are present, the NG-C interface is only present for one of them.

In NR, the following positioning methods may be supported:

Enhanced Cell ID: Essentially cell ID information to associate the device to the serving area of a serving cell, and then additional information to determine a finer granularity position.

Assisted GNSS: GNSS information retrieved by the device, supported by assistance information provided to the device from E-SMLC Downlink Time Difference of Arrival (DL-TDOA): The device estimates the time difference of reference signals from different base stations and sends to the E-SMLC for multilateration.

UTDOA (Uplink TDOA): The device is requested to transmit a specific waveform that is detected by multiple location measurement units (e.g. an eNB) at known positions. These measurements are forwarded to E-SMLC for multilateration Sensor methods such as Biometric pressure sensor which provides vertical position of the device and Inertial Motion Unit (IMU) which provides displacement.

Multi-RTT: The device (e.g. UE) computes UE Rx-Tx and gNBs compute gNB Rx-Tx. The results are combined to find the UE position based upon round trip time calculation.

DL-AoD: gNB or LMF calculates the UE angular position based upon UE DL Reference Signal RSRP measurement results UL-AoA: gNB calculates the UL AoA based upon UE's UL SRS measurements.

Three positioning modes are defined below, e.g. for determining wireless device or UE position:

UE-Assisted: The UE performs measurements with or without assistance from the network and sends these measurements to the E-SMLC where the position calculation may take place.

UE-Based: The UE performs measurements and calculates its own position with assistance from the network.

Standalone: The UE performs measurements and calculates its own position without network assistance.

With emerging new use cases such as autonomous driving, V2X and with the many mobile app-based use case for positioning/navigation, the UE-based positioning mode is gaining more popularity. In such cases, the UE requests the needed information from the Network using Mobile Originating-Location Request (MO-LR) or using the Open Mobile Alliance (OMA) Secure User plane based SUPL procedure.

The current MO-LR procedure is described in TS 36.305v 15.4.0, which is incorporated herein by reference. FIG. 2, from TS 36.305v 15.4.0, shows the sequence of operations for an MO-LR service, starting at the point where an LCS Client in the UE or the user has requested some location service (e.g., retrieval of the UE's location or transfer of the UE's location to a third party). The steps, described fully in TS 36.305v 15.4.0, are summarized as follows. In step 1, the UE sends a NAS level MO-LR request to the MME. In step 2, the MME sends a location request to the E-SMLC and includes any LPP PDU received in step 1. In step 3, there are LPP procedures, e.g. the E-SMLC may obtain location related information from the UE and/or from the serving eNode B. In step 4, there are LPPa procedures, e.g. if the E-SMLC needs location related information for the UE from the eNode B. In step 5, The E-SMLC returns a location response to the MME. In step 6, if the UE requested location transfer to a third party, the MME transfers the location received from the E-SMLC in step 5 to the third party as defined in TS 23.271. In step 7, the MME sends a NAS level MO-LR response to the UE.

FIG. 3 illustrates Secure User Plane Location, SUPL 300 (e.g. from TS 38.305 v15.4.0 and TS 36-305 v15.4.0, which are incorporated herein by reference). SUPL occupies the application layer in the stack, with LPP (or another positioning protocol) transported as another layer above SUPL. Even though, SUPL by definition is carried over the user plane, SUPL operations must take place in combination with control-plane procedures over NRPPa. In FIG. 3, UE communicates with NG-RAN via Uu (e.g. Uu interface). The NG-RAN is connected to a User Plane Function (UPF) via N3 interface, and to AMF via N2 interface. The AMF is connected to Unified Data Management (UDM) via N8 interface, and to a Gateway Mobile Location Centre (GMLC) via NLh. AMF and GMLC are connected via NLg interface. The AMF is also connected to a Location Management Function (LMF) and Secure User Plane Location (SUPL) Positioning Centre (SPC) via NLs. The SPC may communicate with SUPL Location Center (SLC) via Llp, and the UPF may communicate with SLC via N6 and Lup. The SLC may communicate with a LCS client via Le.

SUMMARY

One aspect of the present disclosure provides a method performed by a wireless device for sending a message relating to location services. The method comprises establishing a user plane connection with a location management function, and sending a message relating to location services to the location management function using the user plane connection.

Another aspect of the present disclosure provides a method in an Access and Mobility Management Function (AMF). The method comprises receiving, from a User Equipment (UE), a Mobile Originated-Location Request (MO-LR) or a request to establish a user plane connection with a Location Management Function (LMF), and initiating setup of a user plane connection for messages relating to location services between the UE and the LMF.

A further aspect of the present disclosure provides apparatus in a wireless device for sending a message relating to location services. The apparatus comprises a processor and a memory. The memory contains instructions executable by the processor such that the apparatus is operable to establish a user plane connection with a location management function, and send a message relating to location services to the location management function using the user plane connection.

A still further aspect of the present disclosure provides apparatus in an Access and Mobility Management Function (AMF). The apparatus comprises a processor and a memory. The memory contains instructions executable by the processor such that the apparatus is operable to receive, from a User Equipment (UE), a Mobile Originated-Location Request (MO-LR) or a request to establish a user plane connection with a Location Management Function (LMF), and initiate setup of a user plane connection for messages relating to location services between the UE and the LMF.

An additional aspect of the present disclosure provides apparatus in a wireless device for sending a message relating to location services. The apparatus is configured to establish a user plane connection with a location management function, and send a message relating to location services to the location management function using the user plane connection.

Another aspect of the present disclosure provides apparatus in an Access and Mobility Management Function (AMF). The apparatus is configured to receive, from a User Equipment (UE), a Mobile Originated-Location Request (MO-LR) or a request to establish a user plane connection with a Location Management Function (LMF), and initiate setup of a user plane connection for messages relating to location services between the UE and the LMF.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
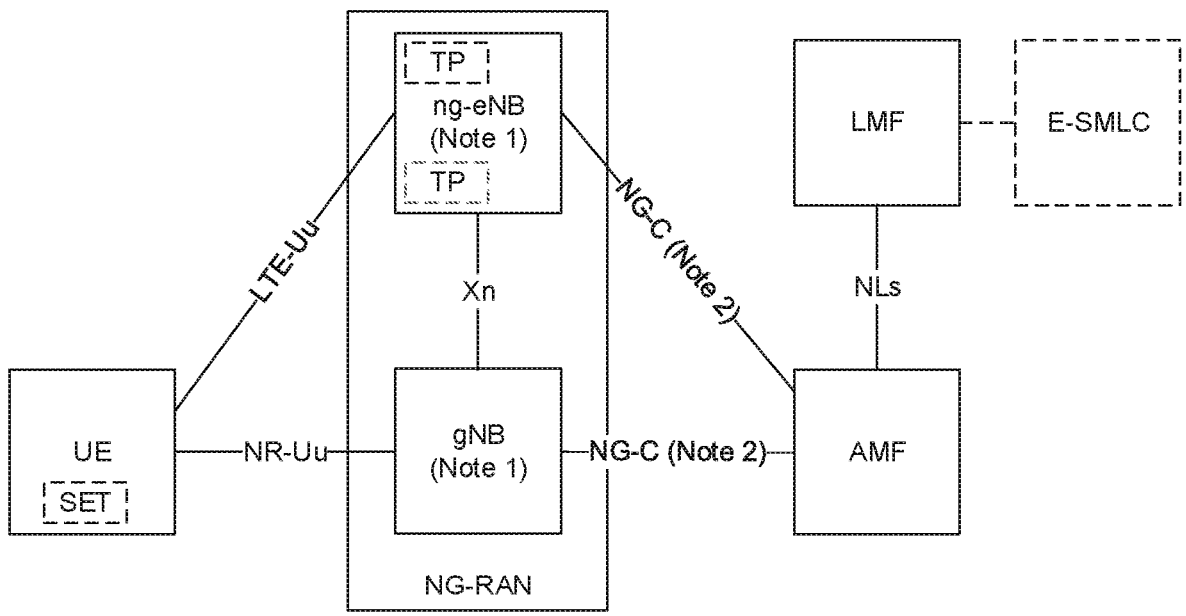
FIG. 1 shows an example of NG-RAN Release 15 location services (LCS) protocols.
Figure 2:
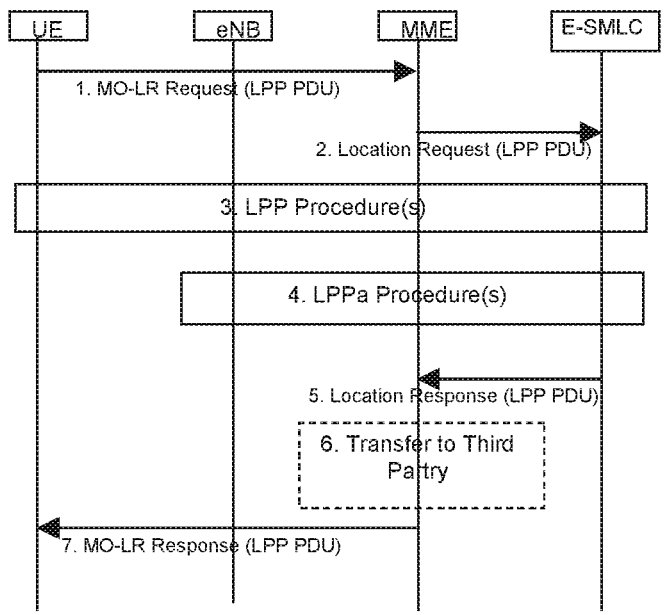
FIG. 2 shows UE Positioning Operations to support an MO-LR from 3GPP TS 36.305 v15.4.0.
Figure 3:
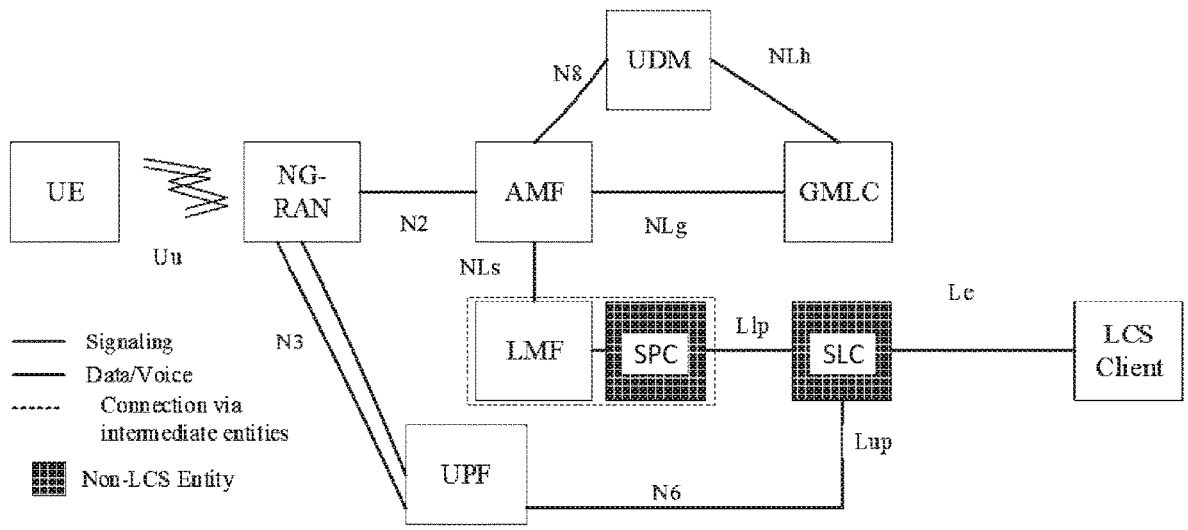
FIG. 3 illustrates Secure User Plane Location (SUPL) from 3GPP TS 38.305 v15.4.0 or TS 36-305 v15.4.0.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

There currently exist certain challenge(s). For example, MO-LR is control plane based and hence for scaling purposes this solution may not be the right choice. All LPP messaging is relayed via the Access and Mobility Management Function, AMF. This may cause excessive load on AMF if the network (NW) is deployed with a centralized AMF. Further, in such deployments it may be problematic to achieve the low latency required in e.g. Cooperative Intelligent Transportation Systems (C-ITS) use cases. This will increase the load on Signaling Radio Bearers (SRBs). SUPL is outside of 3gpp and is maintained by OMA. Further SUPL specifies a complete End-to-End (E2E) procedure that however causes overhead unless a profile of SUPL is defined by 3GPP. The latter may be problematic from a copyright perspective.

Certain aspects of the present disclosure and their embodiments may provide solutions to these or other challenges. For example, methods and apparatus are provided to simplify the assistance data request and delivery. Example methods are provided that may be within 3gpp scope and are scalable.

A first example is presented involving a wireless device (e.g. User Equipment, UE), base station (e.g. gNB) and core network. Examples disclosed herein are presented from a NR perspective, and hence certain terms such as UE, gNB etc are used. However, these examples may also be applied to other technologies and hence such other technologies and examples are also disclosed. Hence, alternatives such as for example a more general base station (of which a gNB is an example) and wireless device (of which a UE is an example) are contemplated.

In a first example:

The UE initiates a PDU session setup with new message/Information Element (IE) content to indicate to AMF that UE wishes to establish a packet connection for transmitting location specific message such as LPP messages, or more generally a message relating to location services.

The AMF determines whether UE is authorized to perform or access location services. AMF selects an LMF. PDU session context is established between CN entities. Data session (e.g. user plane connection) is established between LMF and UE.

Figure 4:
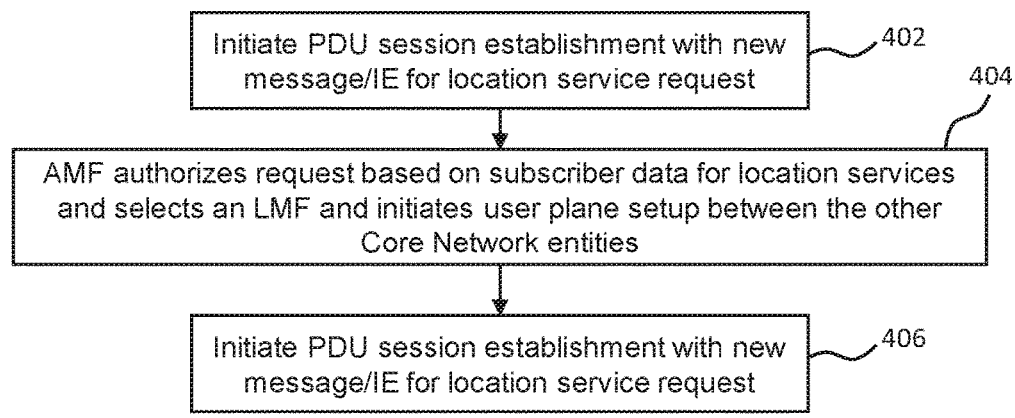
FIG. 4 is a flow chart of an example of a method according to an embodiment of this disclosure.

FIG. 4 is a flow chart of an example of a method 400 according to an embodiment of this disclosure. Step 402 of the method 400 comprises initiating PDU session establishment with new message/IE for location service request. Step 404 of the method 400 comprises the AMF authorizing the request based on subscriber data for location services. The AMF also selects an LMF and initiating user plane setup between the other Core Network entities. This user plane setup may be done by for example setting up a separate PDN connection for LCS and have N6 ref point ('IP connectivity') UE to LMF. Alternatively, this may be done for example by carrying a positioning message as extension of NG-U (GTP-U) then between UE and UPF then transport UPF-SMF on the N6 ref point (non-SBI) and then SMF-LMF on new SBI ref point (or alternatively, new non-SBI ref point UPF to LMF). Alternatively, this may be done for example by adding gateway NF relaying SBI ref point to LMF and IP-based ref point (i.e. N6) to UPF.

Step 406 of the method 400 comprises initiating a PDU session establishment with new message/IE for location service request.

In a second example:

This example may in some cases be used as a fallback method in case the first method is unavailable, inoperable or cannot be used. However in some cases this example may be standalone.

In this example, UE may initiates MO-LR control plane procedure first and obtains necessary information which can then be used to fully establish User plane.

1. UE establish PDN session to (local) UPF (usual PDN session/Not Positioning location service request). Based upon this, UE would now know it exposed IP-address.
2. UE may determine some credentials it will use for TLS session to LMF.
3. UE sends a MO-LR request (carried in NAS) to AMF. Request includes UE IP address and any credentials.
4. AMF authorizes request based on subscriber data.
5. AMF selects an LMF (and may select credentials) and send a positioning request to LMF indicating UE want to open UP LPP session to LMF. Request includes UE IP address and credentials and subscriber data on what service UE is allowed to receive.
6. LMF acknowledge request and includes the IP address the UE shall use
7. AMF acknowledge to UE including LMF IP address
8. UE set up TLS session to LMF authenticating and authorizing by the IP address and TLS credentials.
9. At any time UE or LMF may close TLS/TCP session and UE may initiate a new (but LMF may reject).
10. If UE or LMF see need to change UPF they may terminate the MO-LR session (likely with LCS message over NAS) and UE can modify PDU session to use new UPF (step 1 and forward).

The advantage of some cases of this second example is if for any reason AMF authorization, LMF selection, TLS credentials etc. is not obtained using the first example, UE can fall back and use the second example based upon MO-LR procedure.

There are, proposed herein, various embodiments which address one or more of the issues disclosed herein. For example, according to one aspect of this disclosure, there is provided a method performed by a wireless device for sending a message relating to location services. The method comprises establishing a user plane connection with the location management function, and sending a message relating to location services to the location management function using the user plane connection.

Certain embodiments may provide one or more of the following technical advantage(s). For example, advantages may comprise one or more of: being well integrated with RAN solution; minimization or reduction of latency; a simplified lean procedure that is easy to invoke; scalable; and 3gpp based Integrity Protection.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 5:
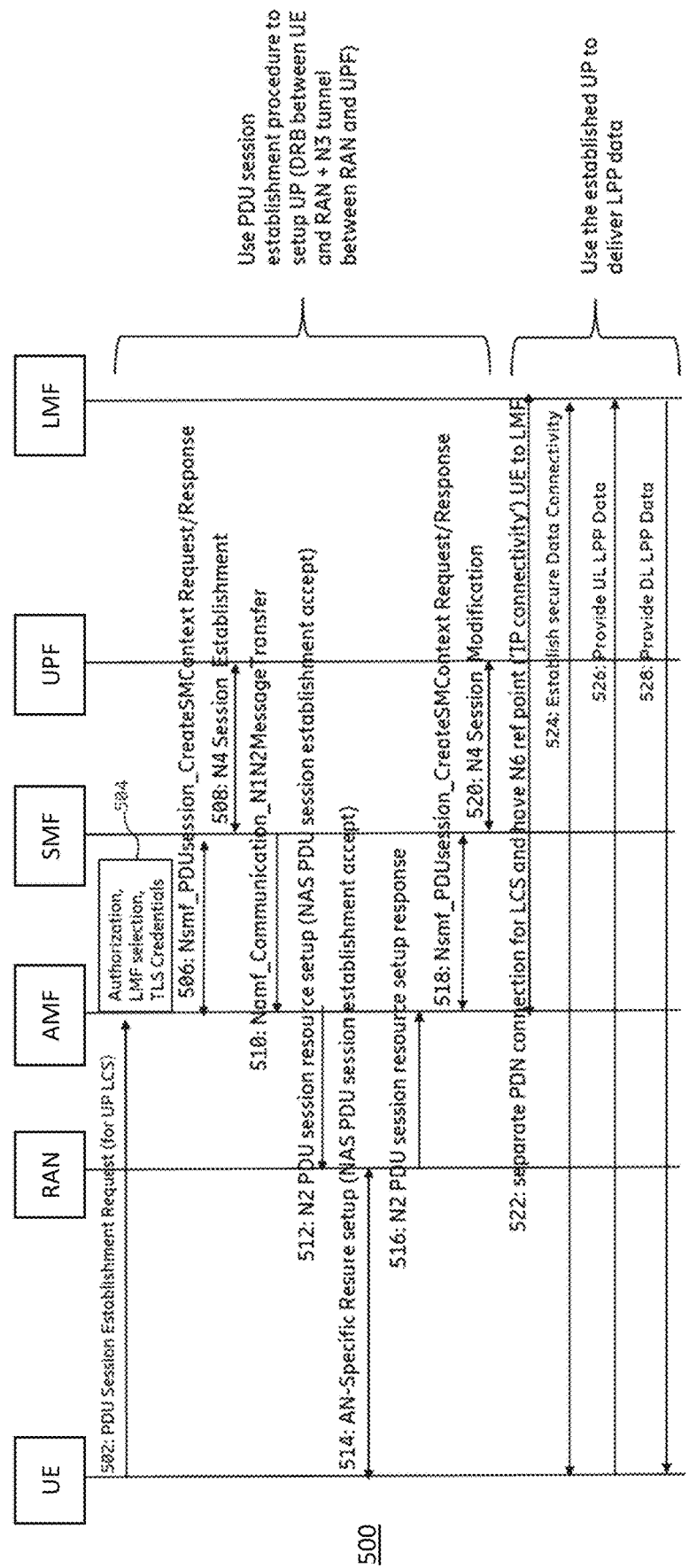
FIG. 5 shows an example of a sequence flow according to an embodiment of this disclosure.

An example sequence flow according to embodiments of this disclosure is provided in FIG. 5, which show for example a sequence flow of positioning assistance data retrieval. A wireless device (referred to in the following and in FIG. 5 as a UE for example) may wish to obtain positioning assistance data, for example in case of RTK GNSS it can be the GNSS Satellite clock correction, orbital correction, atmospheric and ionospheric corrections; for DL-TDOA it can be the Transmission Reception Point (TRP) co-ordinates or Real Time Difference (RTD) RTD. Alternatively, the wireless device/UE may wish to share location information, e.g. its location, for example with a LMF. The UE may thus for example wish to send a message relating to location services, e.g. send a request for positioning assistance data (also referred to herein as location determination assistance data), or send a message containing location information of the UE. In an embodiment, the UE initiates a PDU session establishment with a new message for location service request (e.g. step 502 in FIG. 5).

Upon receiving such a message (e.g. comprising a new Information element content/extension for location service request), in some examples, a first network node, e.g. an Access and Mobility Management Function (AMF), first performs the authorization in some examples (step 504 in FIG. 5), and selects an appropriate LMF. The authorization, if performed, may be based for example on subscriber data from Unified Data Management (UDM). The LMF may in some examples be local to the UE/wireless device or may be local to a User Plane Function (UPF) associated with the wireless device. In some examples, "local" means that the LMF is geographically close to the UE/UPF, is the closest in terms of network latency, distance or cost, and/or any other appropriate meaning for local. In some examples, the AMF may select the appropriate LMF for the wireless device/UE, and send an indication to the UE of the LMF, such as for example the IP address of the LMF.

A user plane connection is setup between the LMF and the UE, for example via UPF. That is, for example, positioning data (e.g. a message relating to location services, such as containing location information and/or requesting assistance data) may be tunneled over NG-U between UPF and base station (referred to in these examples as a gNB), and over data radio bearer between the gNB and UE. FIG. 5 shows an example of a sequence flow. In FIG. 5, a user plane connection is established between UE and LMF, for example setting up a DRB between UE and RAN, and a N3 tunnel between RAN and UPF. The UE sends a PDU Session Establishment Request to the AMF. This could be an example of a request to establish a user plane connection with a location management function that is sent to the AMF, which is an example of a first network node.

In FIG. 5, in step 502, UE sends a PDU Session Establishment Request to the AMF via RAN (e.g. via base station). In step 504, AMF checks authorization, with TLS credentials, and selects a LMF. In step 506, session management context is setup between AMF and SMF for managing PDU session. In step 508 PDU session is established between SMF and UPF. In step 510, once connection is established between SMF and UPF, the response is provided to AMF. In step 512, SMF asks RAN (via AMF) to establish user plane resources and also deliver the NAS. In step 514, RAN establishes the resources at the RRC level and also deliver the NAS PDU session establishment Accept to UE. In step 516, RAN provides the user plane tunnel info the SMF (via AMF), after radio resource is ready between UE and RAN. In step 518, the service operation shall be Nsmf_PDUSession_UpdateSMContext Request. In step 520, SMF provides the user plane tunnel info via N4 session modification. In step 522, there is separate PDN connection for LCS (e.g. between AMF and LMF) and a N6 reference point ('IP connectivity') UE to LMF. In step 524, a user plane session/connection is operational between UE and LMF. In step 526, UE provides uplink (UL) LPP data, for example the UE sends a LPP message such as for example a request for Assistance data or reports measurements to LMF via user plane, or any response message of an earlier downlink (DL) LPP message. In step 528, LMF provides downlink LPP data via user plane to UE.

There are several example mechanisms to set up or implement the user plane between LMF and UPF (which may be for example part of the user plane connection between the UE and the LMF), which are described below as separate (non-exhaustive) examples:
1. Carry data over N4 to SMF (and then with new reference point to LMF). N4 is assumed to carry data as container over N4 protocol.
2. Create a new Non-SBI Reference point UPF-LMF. This may in some examples be a persistent SCTP connection from UPFs to LMFs (as for other UP to CP plane connections).
3. Use 'normal' IP connectivity UE-LMF. This would mainly use existing function in UPF/SMF/AMF. Requires a transport protocol for LPP (e.g. TLS/TCP). Requires a PDU session to be set up and requires UE to know the IP-address of LMF, which could be provided for example by the AMF to the UE, for example in response to a message from the UE (e.g. a request to establish a user plane connection with a LMF).

In some examples, in order to reduce latency for the overall user plane (or user plane connection) setup/establishment procedure, as the procedures on establishing the user plane, UP (e.g. PDU session) may not be fast enough and require connection between different entities. A persistent or semi-persistent connection (e.g. semi-persistent context, PDU session) may be established, for example based on subscription info (and UE config) that UE will/may need UP LPP transport.

In some examples, to achieve low latency the UPF and LMF need to be 'close' (Edge Computing) to each other (e.g. local as suggested above). NG-U can in some examples tunnel data from UE to UPF with different QoS (can be different data type IP, unstructured . . . ). Further, in some examples, with regards to QoS profile, when it comes to PDU session establishment, a specific APN/DNN shall be used for the location services (LCS) PDU session. In some examples, the APN/DNN configuration profile (e.g. QoS parameters defined for the PDU session) shall be provided by HSS/UDM to MME/AMF/SMF or It can be a local configuration in MME/AMF/SMF.

In some examples, for positioning there may be location metric related QoS profiles, depending on for example how accurate and how fast is the positioning should be. Thus, depending upon the location QoS, the PDU session QoS parameter may vary.

Further, in some examples, in the RAN, the different Location service QoS options based upon CN configurations will be mapped to RAN internal QoS profile. RAN while scheduling the data shall take the QoS as one of the inputs.

It is also possible in some examples that Mobile Terminated Location request (MT-LR) or Network Initiated Location Request (NI-LR) is supported by the same framework. In this case, AMF may obtain the positioning request from external client such as GMLC Node and afterwards the flow as shown in FIG. 5 may still be applicable based upon AMF selecting LMF and establishing PDU session.

Figure 6:
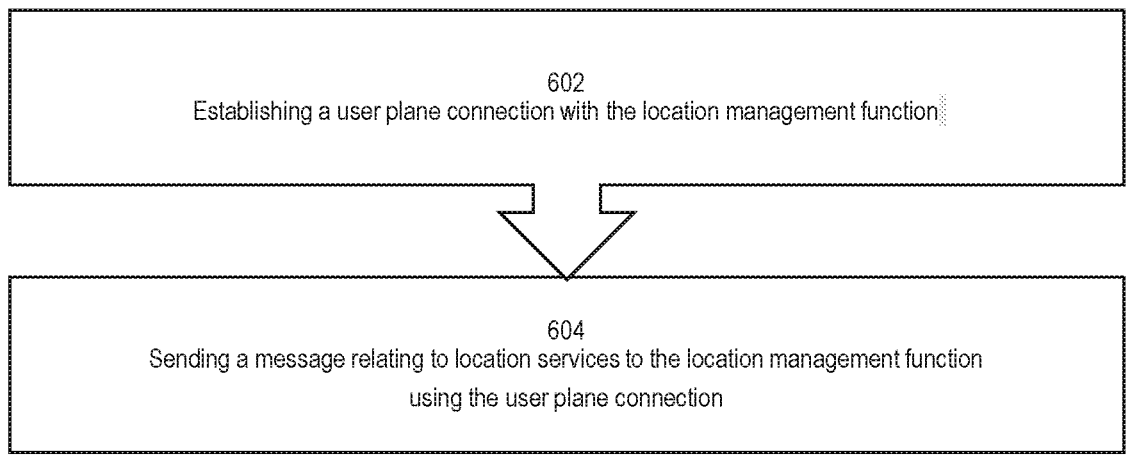
FIG. 6 depicts a method in accordance with particular embodiments.

FIG. 6 depicts a method in accordance with particular embodiments, and comprises for example a method performed by a wireless device for sending a message relating to location services. The method begins at step 602 with establishing a user plane connection with the location management function, and continues to step 604, with sending a message relating to location services to the location management function using the user plane connection.

In some examples, the method 600 comprises receiving an indication of a location management function from a first network node before establishing the user plane connection with the location management function. The method may also in some examples comprise receiving the indication of the location management function after sending a request to establish a user plane connection with a location management function to the first network node, and may also comprise establishing a Packet Data Network, PDN, session with the first network node before sending the request to the first network node. The request may for example indicate security credentials for the user plane connection.

In some examples, sending the message to the location management function using the user plane connection comprises sending the message via a User Plane Function, UPF, associated with the wireless device. Sending the message to the location management function using the user plane connection may comprise for example sending the message via a first reference point between the UPF and a Session Management Function, SMF, and via a second reference point between the SMF and the location management function. The first reference point may comprise for example a N4 reference point. Sending the message to the location management function using the user plane connection in some examples comprises sending the message via a reference point between the UPF and the location management function. The reference point may comprise for example a non-service based interface reference point.

Sending the message to the location management function using the user plane connection in some examples may comprise sending the message via a first reference point between the UPF and a Session Management Function, SMF, and via a second reference point between the SMF and the location management function, and the method further comprises, after sending the message to the location management function, terminating the user plane connection to the location management function, and establishing a new user plane connection with the location management function. In some examples, terminating the user plane connection to the location management function and establishing the new user plane connection with the location management function is performed after determining that the wireless device is associated with a second UPF.

In some examples, the indication of the location management function comprises an IP address of the location management function.

Establishing the user plane connection with the location management function I some examples comprises establishing the user plane connection using the IP address of the location management function.

In some examples, the message comprises a location services, LCS, message, wherein the LCS message comprises a request for location determination assistance data and/or indicates a location information of the wireless device. The LCS message may comprise for example the request for location determination assistance data, and the location determination assistance data comprises one or more of GNSS Satellite clock correction, orbital correction, atmospheric correction and/or ionospheric correction, and/ or DL-TDOA TRP co-ordinates or RTD. The method in some examples may comprise receiving location determination assistance data from the location management function using the user plane connection after sending the request for location determination assistance data. The method may also comprise in some examples maintaining the user plane connection after receiving the location determination assistance data.

The user plane connection may comprise for example at least one of a PDU session, TCP session and TLS session. The first network function may comprise for example an Access and Mobility Management Function, AMF. The wireless device may comprises for example a User Equipment, UE.

The method in some examples may comprise establishing the user plane connection with the location management function after receiving a request from a first network node or Access and Mobility Management Function (AMF) to establish a user plane connection with the location management function or after receiving a request from an application layer of the wireless device to establish a user plane connection with a location management function.

Figure 7:
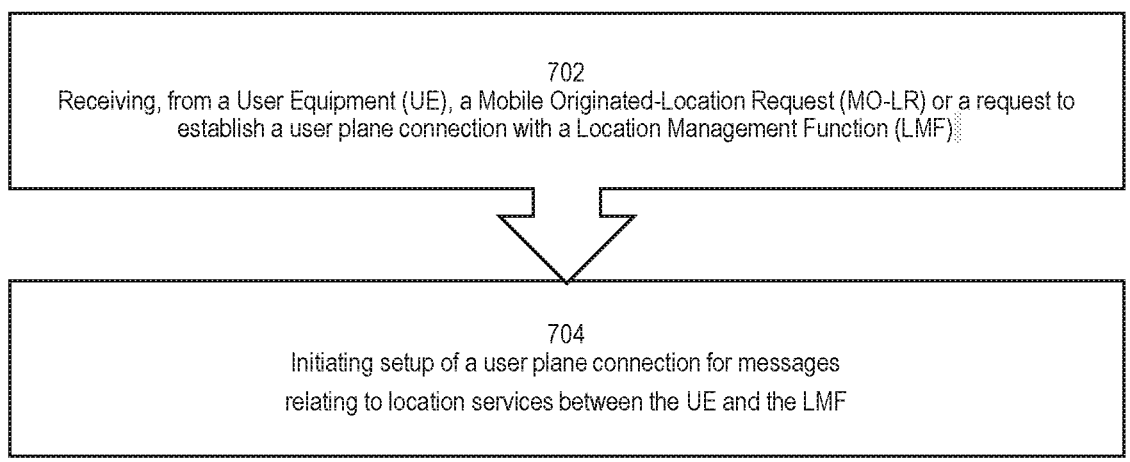
FIG. 7 depicts another method in accordance with particular embodiments.

FIG. 7 depicts a method in accordance with particular embodiments, and comprises for example a method in an Access and Mobility Management Function (AMF). The method begins at step 702 with receiving, from a User Equipment (UE), a Mobile Originated-Location Request (MO-LR) or a request to establish a user plane connection with a Location Management Function (LMF). The method 700 continues from step 702 to step 704, with initiating setup of a user plane connection for messages relating to location services between the UE and the LMF.

In some examples, initiating setup of the user plane connection for messages relating to location services between the UE and the LMF may comprise initiating setup of a Packet Data Network (PDN) connection between the UE and the LMF.

The method 700 in some examples may comprise authorizing the request from the UE based on subscriber data from the UE before initiating setup of the user plane connection.

Figure 8:
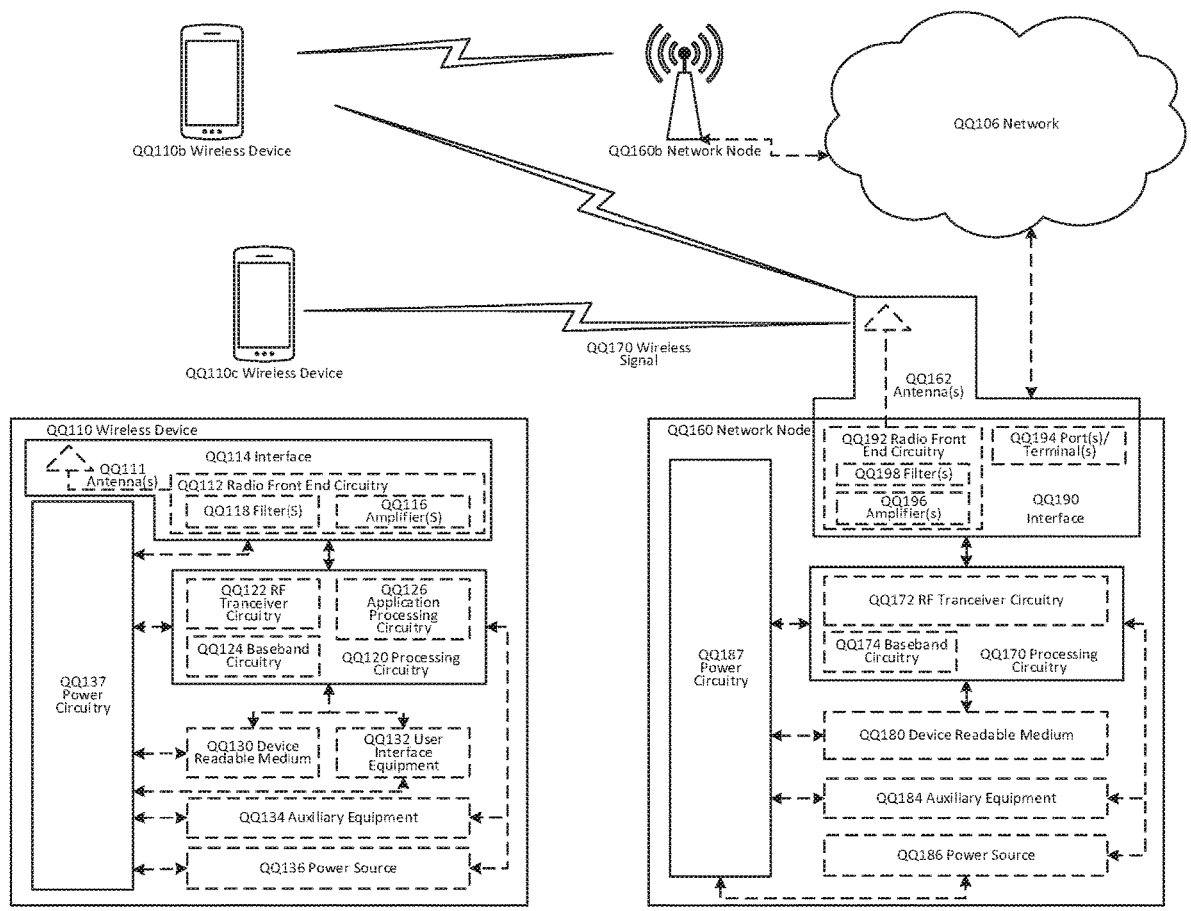
FIG. 8 shows an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190.

In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 8 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 9:
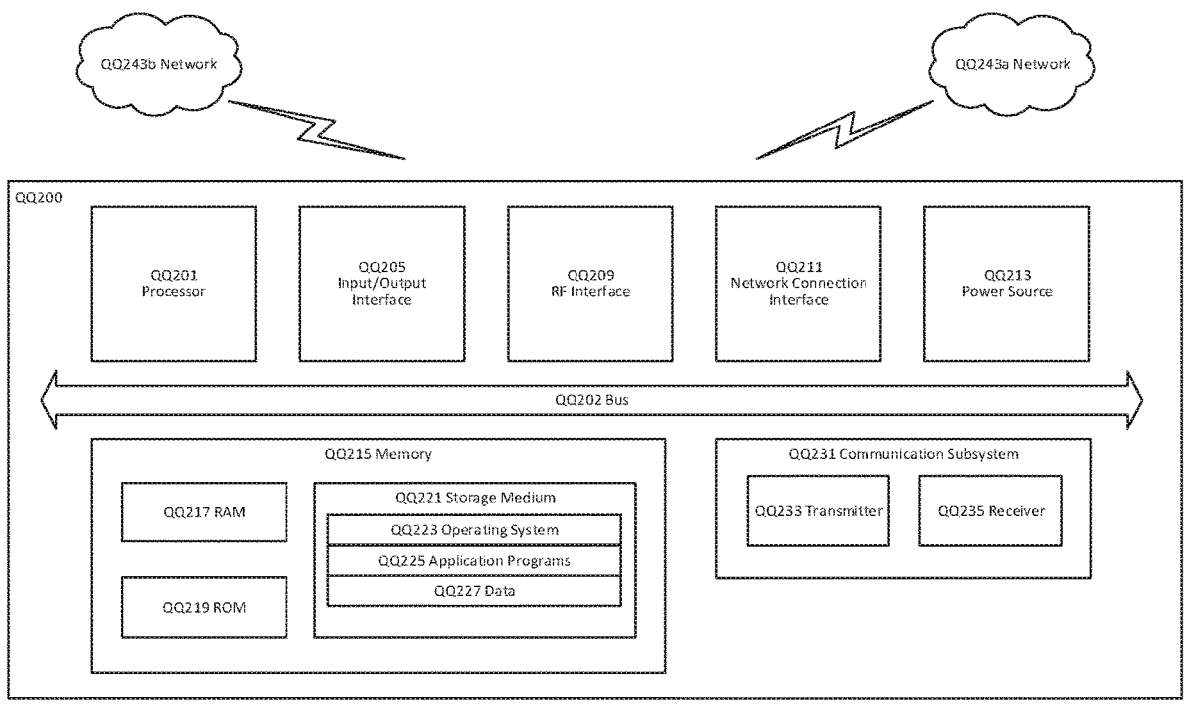
FIG. 9 shows an example of a User Equipment in accordance with some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 9, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 10:
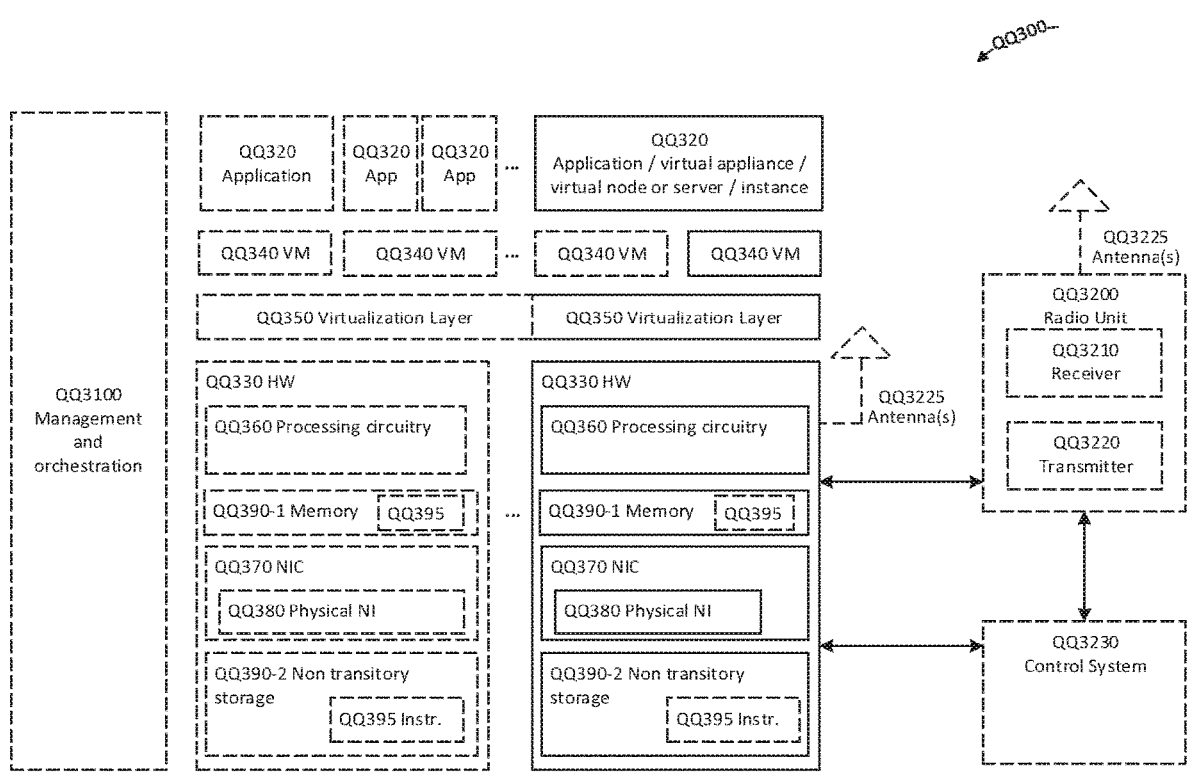
FIG. 10 shows an example of a virtualization environment in accordance with some embodiments.

FIG. 10 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 10, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 10.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

With reference to Figure FIG. 1111, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

Figure 11:
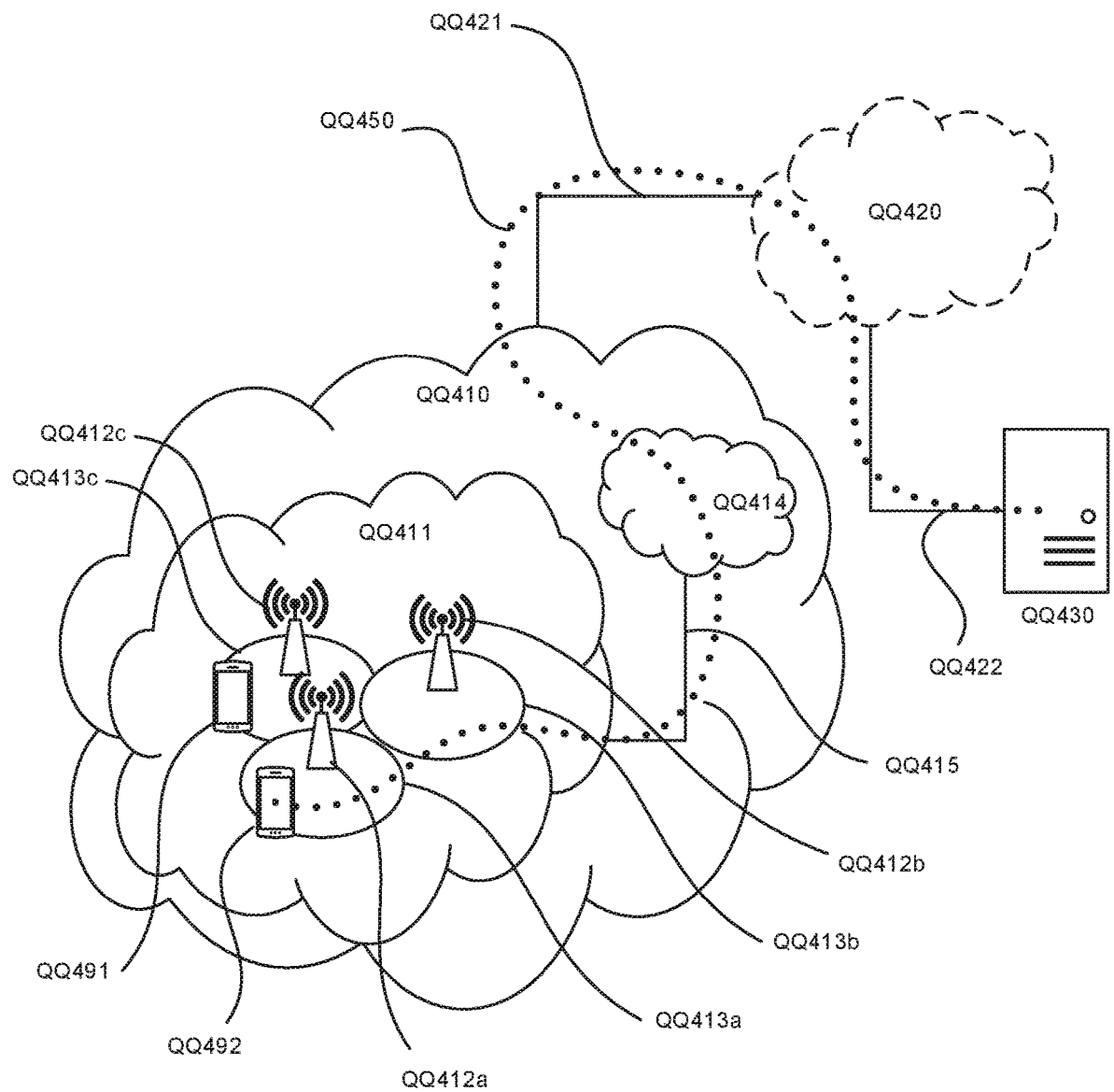
FIG. 11 shows an example of a telecommunication network connected via an intermediate network to a host computer in accordance with some embodiments.

The communication system of FIG. 11 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 12. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 12) served by base station QQ520. Communication interface QQ526 may be configured to facilitate connection QQ560 to host computer QQ510. Connection QQ560 may be direct or it may pass through a core network (not shown in FIG. 12) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 12:
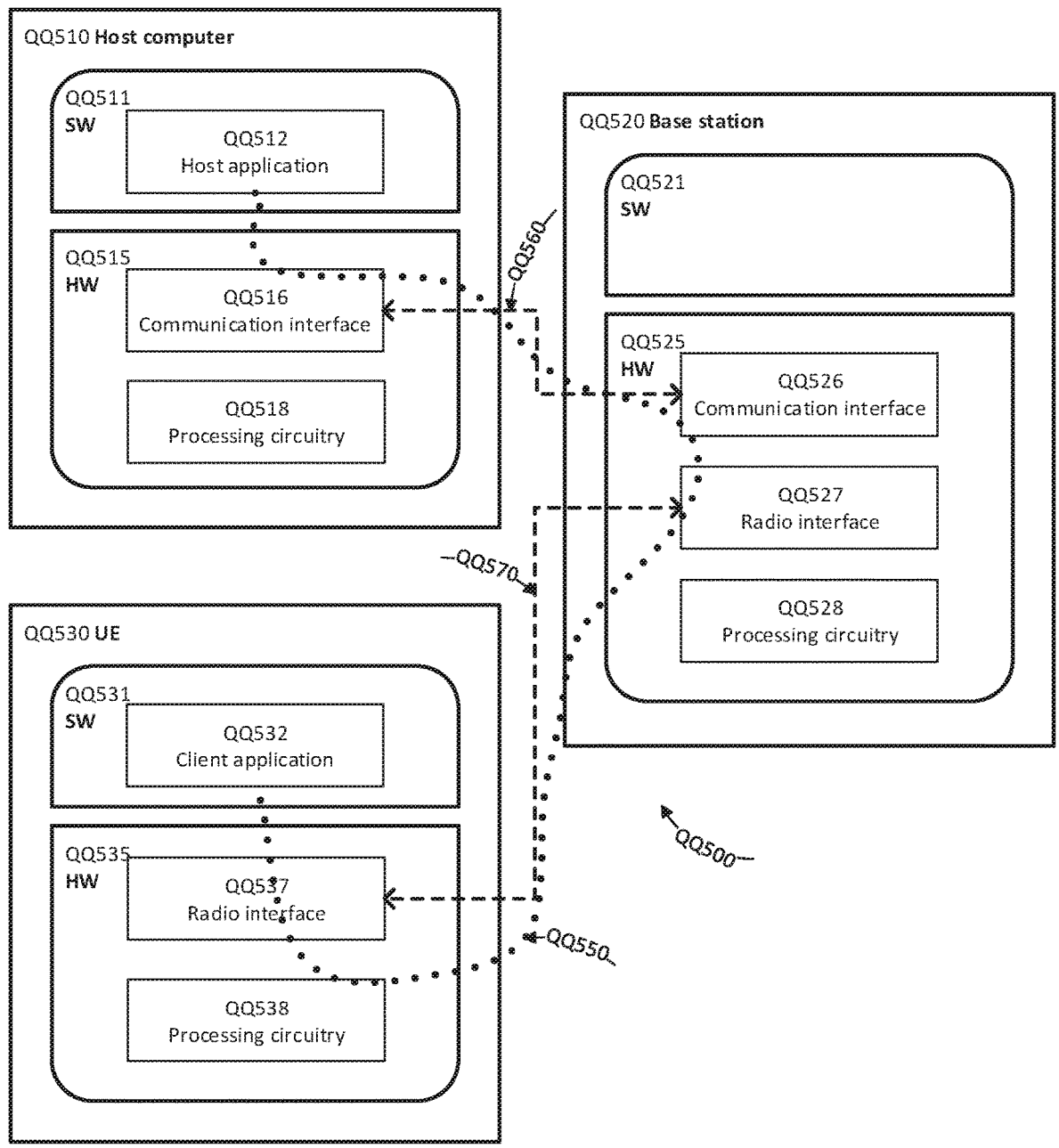
FIG. 12 shows an example of a host computer communicating via a base station with a user equipment over a partially wireless connection in accordance with some embodiments.

It is noted that host computer QQ510, base station QQ520 and UE QQ530 illustrated in FIG. 12 may be similar or identical to host computer QQ430, one of base stations QQ412a, QQ412b, QQ412c and one of UEs QQ491, QQ492 of FIG. 11, respectively. This is to say, the inner workings of these entities may be as shown in FIG. 12 and independently, the surrounding network topology may be that of FIG. 11.

In FIG. 12, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may provide benefits such as improved network efficiency and/or utilization and/or faster positioning (or at least obtaining positioning or location determination related data more quickly/efficiently, or sharing of location information more quickly/efficiently).

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 13:
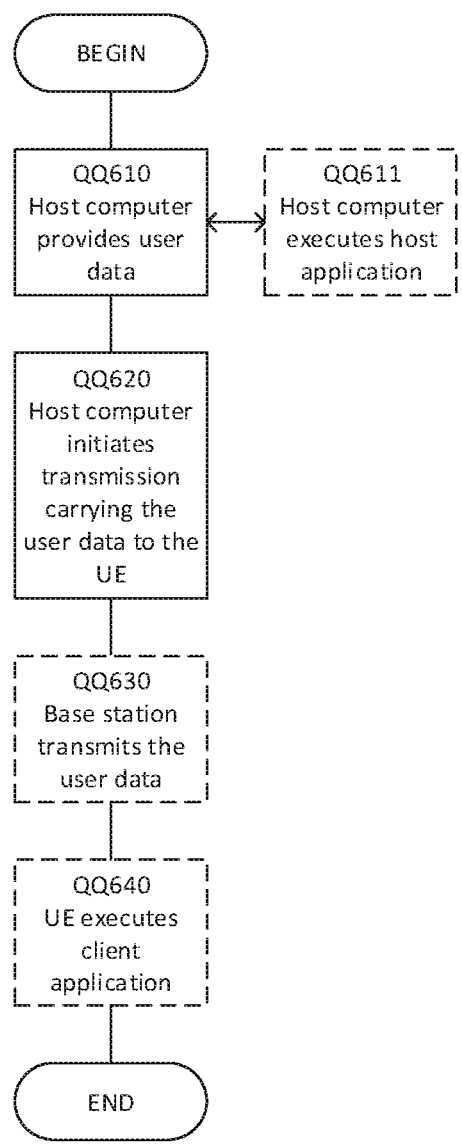
FIG. 13 shows examples of methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 14:
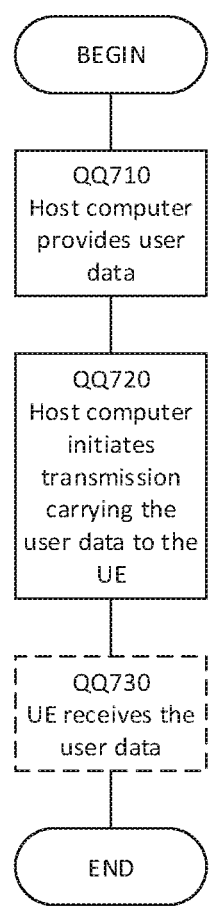
FIG. 14 shows examples of methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 15:
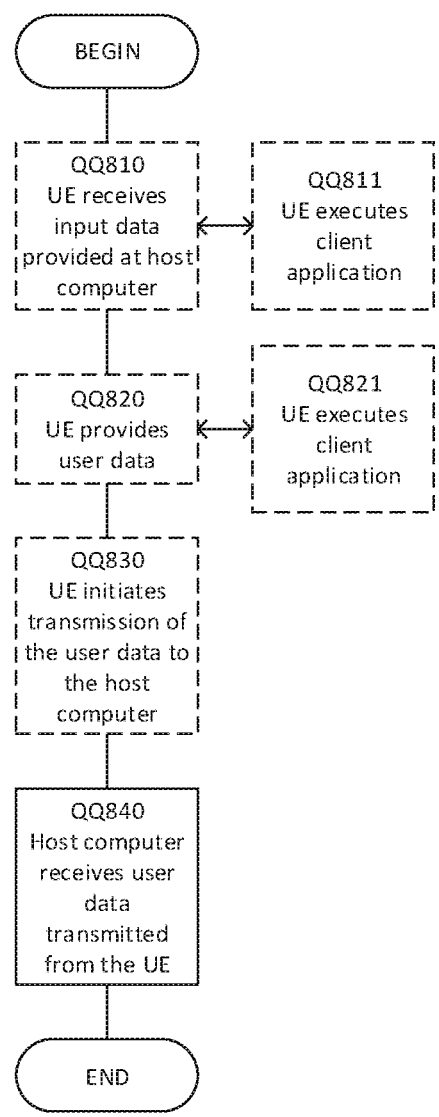
FIG. 15 shows examples of methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 16:
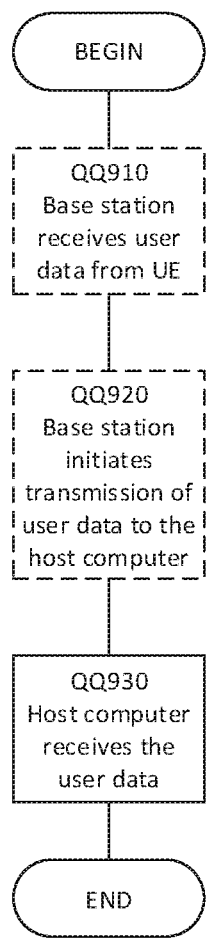
FIG. 16 shows examples of methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Figure 17:
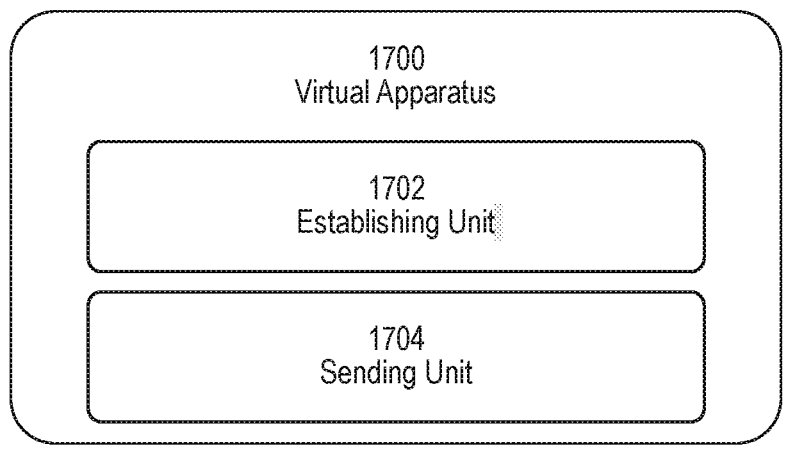
FIG. 17 shows an example of virtualization apparatus in accordance with some embodiments.

FIG. 17 illustrates a schematic block diagram of an apparatus 1700 in a wireless network (for example, the wireless network shown in FIG. 8). The apparatus may be implemented in a wireless device or network node (e.g., wireless device QQ110 or network node QQ160 shown in FIG. 8). Apparatus 1700 is operable to carry out the example method described with reference to FIG. 6 and possibly any other processes or methods disclosed herein. It is also to be understood that the method of FIG. 6 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause establishing unit 1702, sending unit 1704, and any other suitable units of apparatus 1700 to perform corresponding functions according one or more embodiments of the present disclosure.

As illustrated in FIG. 17, apparatus 1700 includes establishing unit 1702 configured to establish a user plane connection with the location management function, and sending unit 1704 configured to send a message relating to location services to the location management function using the user plane connection.

Figure 18:
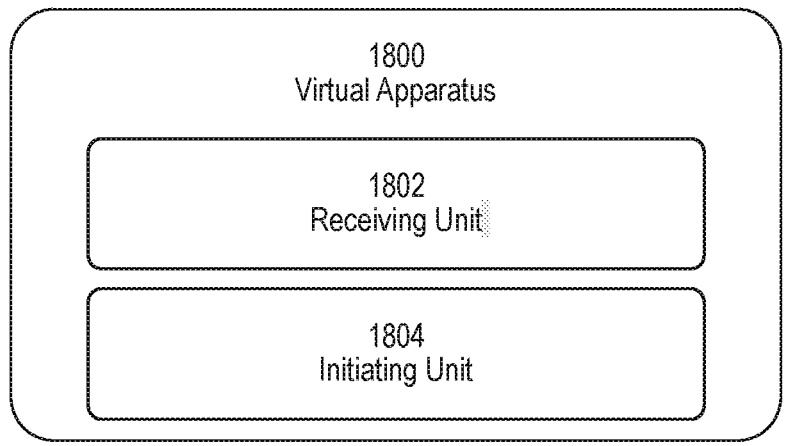
FIG. 18 shows another example of virtualization apparatus in accordance with some embodiments.

FIG. 18 illustrates a schematic block diagram of an apparatus 1800 in a wireless network (for example, the wireless network shown in FIG. 8). The apparatus may be implemented in a wireless device or network node (e.g., wireless device QQ110 or network node QQ160 shown in FIG. 8). Apparatus 1800 is operable to carry out the example method described with reference to FIG. 7 and possibly any other processes or methods disclosed herein. It is also to be understood that the method of FIG. 7 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1802, initiating unit 1804, and any other suitable units of apparatus 1800 to perform corresponding functions according one or more embodiments of the present disclosure.

As illustrated in FIG. 18, apparatus 1800 includes receiving unit 1802 configured to receive, from a User Equipment (UE), a Mobile Originated-Location Request (MO-LR) or a request to establish a user plane connection with a Location Management Function (LMF), and initiating unit 1804 configured to initiate setup of a user plane connection for messages relating to location services between the UE and the LMF.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following enumerated embodiments are included in this disclosure.

EMBODIMENTS

Group A Embodiments

1. A method performed by a wireless device for sending a message relating to location services, the method comprising:
   establishing a user plane connection with the location management function; and
   sending a message relating to location services to the location management function using the user plane connection.
2. The method of embodiment 1, comprising receiving an indication of a location management function from a first network node before establishing the user plane connection with the location management function.
3. The method of embodiment 2, comprising receiving the indication of the location management function after sending a request to establish a user plane connection with a location management function to the first network node.
4. The method of embodiment 3, comprising establishing a Packet Data Network, PDN, session with the first network node before sending the request to the first network node.
5. The method of any of embodiments 1 to 4, wherein sending the message to the location management function using the user plane connection comprises sending the message via a User Plane Function, UPF, associated with the wireless device.
6. The method of embodiment 5, wherein sending the message to the location management function using the user plane connection comprises sending the message via a first reference point between the UPF and a Session Management Function, SMF, and via a second reference point between the SMF and the location management function.
7. The method of embodiment 6, wherein the first reference point comprises a N4 reference point.
8. The method of embodiment 5, wherein sending the message to the location management function using the user plane connection comprises sending the message via a reference point between the UPF and the location management function.
9. The method of embodiment 8, wherein the reference point comprises a non-service based interface reference point.
10. The method of any of embodiments 5 to 9, comprising, after sending the message to the location management function, terminating the user plane connection to the location management function, and establishing a new user plane connection with the location management function.
11. The method of embodiment 10, wherein terminating the user plane connection to the location management function and establishing the new user plane connection with the location management function is performed after determining that the wireless device is associated with a second UPF.
12. The method of any of embodiments 5 to 11, wherein the location management function is local to the UPF.
13. The method of any of embodiments 1 to 12, wherein the location management function is local to the wireless device.
14. The method of any of embodiments 1 to 13, wherein the indication of the location management function comprises an IP address of the location management function.
15. The method of embodiment 14, wherein establishing the user plane connection with the location management function comprises establishing the user plane connection using the IP address of the location management function.
16. The method of any of embodiments 1 to 15, wherein the request indicates security credentials for the user plane connection.
17. The method of any of embodiments 1 to 16, wherein the message comprises a location services, LCS, message.
18. The method of embodiment 17, wherein the LCS message comprises a request for location determination assistance data and/or indicates a location Information of the wireless device.
19. The method of embodiment 18, wherein the location determination assistance data comprises one or more of GNSS Satellite clock correction, orbital correction, atmospheric correction and/or ionospheric correction, and/or DL-TDOA TRP co-ordinates or RTD.
20. The method of embodiment 18 or 19, comprising receiving location determination assistance data from the location management function using the user plane connection after sending the request for location determination assistance data.
21. The method of embodiment 20, comprising maintaining the user plane connection after receiving the location determination assistance data.
22. The method of any of embodiments 1 to 21, wherein the user plane connection comprises at least one of a PDU session, TCP session and TLS session.
23. The method of any of embodiments 1 to 22, wherein the first network function comprises an Access and Mobility Management Function, AMF.
24. The method of any of embodiments 1 to 23, wherein the wireless device comprises a User Equipment, UE.
25. The method of any of embodiments 1 to 24, comprising establishing the user plane connection with the location management function after receiving a request from a first network node or AMF to establish a user plane connection with the location management function or after receiving a request from an application layer of the wireless device to establish a user plane connection with a location management function.

26. The method of any of embodiments 1 to 25, further comprising:
    obtaining user data; and
    forwarding the user data to a host computer or a wireless device.

Group C Embodiments

27. A wireless device for sending a message, the wireless device comprising:
    processing circuitry configured to perform any of the steps of any of the Group A embodiments; and
    power supply circuitry configured to supply power to the wireless device.
28. A user equipment (UE) for sending a message, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.
29. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform any of the steps of any of the Group A embodiments.
30. The communication system of the previous embodiment, wherein the cellular network further includes a base station configured to communicate with the UE.
31. The communication system of the previous 2 embodiments, wherein:
    the processing circuitry of the host computer is configured to execute a host application, thereby providing the user data; and
    the UE's processing circuitry is configured to execute a client application associated with the host application.
32. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of the Group A embodiments.
33. The method of the previous embodiment, further comprising at the UE, receiving the user data from the base station.
34. A communication system including a host computer comprising:
    communication interface configured to receive user data originating from a transmission from a user equipment (UE) to a base station,
    wherein the UE comprises a radio interface and processing circuitry, the UE's processing circuitry configured to perform any of the steps of any of the Group A embodiments.
35. The communication system of the previous embodiment, further including the UE.
36. The communication system of the previous 2 embodiments, further including the base station, wherein the base station comprises a radio interface configured to communicate with the UE and a communication interface configured to forward to the host computer the user data carried by a transmission from the UE to the base station.
37. The communication system of the previous 3 embodiments, wherein:
    the processing circuitry of the host computer is configured to execute a host application; and
    the UE's processing circuitry is configured to execute a client application associated with the host application, thereby providing the user data.
38. The communication system of the previous 4 embodiments, wherein:
    the processing circuitry of the host computer is configured to execute a host application, thereby providing request data; and
    the UE's processing circuitry is configured to execute a client application associated with the host application, thereby providing the user data in response to the request data.
39. A method implemented in a communication system including a host computer, a base station and a user equipment (UE), the method comprising:
    at the host computer, receiving user data transmitted to the base station from the UE, wherein the UE performs any of the steps of any of the Group A embodiments.
40. The method of the previous embodiment, further comprising, at the UE, providing the user data to the base station.
41. The method of the previous 2 embodiments, further comprising:
    at the UE, executing a client application, thereby providing the user data to be transmitted; and
    at the host computer, executing a host application associated with the client application.
42. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.

43. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

44. The method of the previous embodiment, further comprising at the base station, receiving the user data from the UE.

45. The method of the previous 2 embodiments, further comprising at the base station, initiating a transmission of the received user data to the host computer.

The invention claimed is:

1. A method performed by a wireless device for sending a message relating to location services, the method comprising:
sending a request to establish a user plane connection with a location management function to a first network node comprising an Access and Mobility Management Function (AMF);
establishing the user plane connection with the location management function;
sending a message relating to location services to the location management function using the user plane connection, the sending including sending the message via a first reference point between a User Plane Function (UPF) and a Session Management Function (SMF) and via a second reference point between the SMF and the location management function; and
after sending the message to the location management function, terminating the user plane connection to the location management function, and establishing a new user plane connection with the location management function.

2. The method of claim 1, comprising receiving an indication of a location management function from the first network node before establishing the user plane connection with the location management function.

3. The method of claim 2, comprising receiving the indication of the location management function after sending the request to establish the user plane connection with the location management function to the first network node.

4. The method of claim 3, comprising establishing a Packet Data Network (PDN) session with the first network node before sending the request to the first network node.

5. The method of claim 3, wherein the request indicates security credentials for the user plane connection.

6. The method of claim 1, wherein sending the message to the location management function using the user plane connection comprises sending the message via the User Plane Function (UPF) associated with the wireless device.

7. The method of claim 1, wherein terminating the user plane connection to the location management function and establishing the new user plane connection with the location management function is performed after determining that the wireless device is associated with a second UPF.

8. The method of claim 1, wherein establishing the user plane connection with the location management function comprises establishing the user plane connection using an IP address of the location management function.

9. The method of claim 1, wherein the message comprises a location services (LCS) message, wherein the LCS message at least one of comprises a request for location determination assistance data and indicates a location information of the wireless device.

10. The method of claim 1, wherein the user plane connection comprises at least one of a PDU session, TCP session and TLS session.

11. The method of claim 1, comprising establishing the user plane connection with the location management function after receiving a request from a first network node or Access and Mobility Management Function (AMF) to establish a user plane connection with the location management function or after receiving a request from an application layer of the wireless device to establish a user plane connection with a location management function.

12. A method in an Access and Mobility Management Function, comprising:
receiving, from a User Equipment (UE), a Mobile Originated-Location Request (MO-LR);
authorizing the MO-LR based on subscriber data from the UE;
selecting a Location Management Function (LMF) and sending an indication of the selected LMF to the UE; and
initiating setup of a user plane connection for messages relating to location services between the UE and the LMF.

13. The method of claim 12, wherein initiating setup of the user plane connection for messages relating to location services between the UE and the LMF comprises initiating setup of a Packet Data Network (PDN) connection between the UE and the LMF.

14. An apparatus in a wireless device for sending a message relating to location services, the apparatus comprising a processor and a memory, the memory containing instructions executable by the processor such that the apparatus is configured to:
send a request to establish a user plane connection with a location management function to a first network node comprising an Access and Mobility Management Function (AMF);
establish a user plane connection with a location management function; and
send a message relating to location services to the location management function using the user plane connection, the sending including sending the message via a first reference point between a User Plane Function (UPF) and a Session Management Function (SMF) and via a second reference point between the SMF and the location management function; and
after sending the message to the location management function, terminate the user plane connection to the location management function, and establish a new user plane connection with the location management function.

15. An apparatus in an Access and Mobility Management Function (AMF), the apparatus comprising a processor and a memory, the memory containing instructions executable by the processor such that the apparatus is configured to:
receive, from a User Equipment (UE), a Mobile Originated-Location Request (MO-LR);
authorize the MO-LR based on subscriber data from the UE;
select a Location Management Function (LMF) and send an indication of the selected LMF to the UE; and
initiate setup of a user plane connection for messages relating to location services between the UE and the LMF.

16. The method of claim 4, wherein the request indicates security credentials for the user plane connection.

* * * * *